(12) United States Patent
Dron

(10) Patent No.: US 7,527,220 B2
(45) Date of Patent: May 5, 2009

(54) AIRCRAFT ENGINE MOUNT

(75) Inventor: Sebastien Dron, Montrouge (FR)

(73) Assignee: Snecma, Paris (FR)

( * ) Notice: Subject to any disclaimer, the term of this patent is extended or adjusted under 35 U.S.C. 154(b) by 173 days.

(21) Appl. No.: 11/087,604

(22) Filed: Mar. 24, 2005

(65) Prior Publication Data
US 2005/0269446 A1 Dec. 8, 2005

(30) Foreign Application Priority Data
Mar. 25, 2004 (FR) .................... 04 03055

(51) Int. Cl.
*B64D 27/00* (2006.01)
(52) U.S. Cl. ................... 244/54; 248/555
(58) Field of Classification Search ......... 248/554–557; 244/54
See application file for complete search history.

(56) References Cited

U.S. PATENT DOCUMENTS

| | | | | |
|---|---|---|---|---|
| 3,831,888 | A | * | 8/1974 | Baker et al. .................... 244/54 |
| 5,078,342 | A | * | 1/1992 | Langley et al. ................ 244/54 |
| 5,275,357 | A | * | 1/1994 | Seelen et al. .................. 244/54 |
| 5,277,382 | A | * | 1/1994 | Seelen et al. .................. 244/54 |
| 5,303,880 | A | * | 4/1994 | Cencula et al. ............... 244/54 |
| 5,320,307 | A | * | 6/1994 | Spofford et al. .............. 244/54 |
| 5,620,154 | A | * | 4/1997 | Hey ............................ 244/54 |
| 5,649,417 | A | * | 7/1997 | Hey ............................ 60/797 |
| 5,860,623 | A | * | 1/1999 | Dunstan et al. ............... 244/54 |
| 5,873,547 | A | * | 2/1999 | Dunstan ..................... 244/54 |
| 6,059,227 | A | * | 5/2000 | Le Blaye et al. ............. 244/54 |
| 6,330,995 | B1 | * | 12/2001 | Mangeiga et al. ........... 248/554 |
| 6,341,746 | B1 | | 1/2002 | Pascal et al. |
| 6,347,765 | B1 | | 2/2002 | Jule et al. |
| 6,474,596 | B1 | | 11/2002 | Cousin et al. |
| 6,601,796 | B2 | * | 8/2003 | Roszak ....................... 244/54 |
| 6,843,449 | B1 | * | 1/2005 | Manteiga et al. ............. 244/54 |
| 7,021,585 | B2 | * | 4/2006 | Loewenstein et al. ........ 244/54 |
| 7,108,224 | B2 | * | 9/2006 | Pasquer et al. .............. 244/54 |

(Continued)

FOREIGN PATENT DOCUMENTS

EP 1 216 921 A1 6/2002

(Continued)

OTHER PUBLICATIONS

U.S. Appl. No. 12/103,258, filed Apr. 15, 2008, Dron, et al.

*Primary Examiner*—Michael R Mansen
*Assistant Examiner*—Joseph W Sanderson
(74) *Attorney, Agent, or Firm*—Oblon, Spivak, McClelland, Maier & Neustadt, P.C.

(57) ABSTRACT

A mount for an aircraft engine arranged to be attached firstly by a beam to the aircraft, and secondly by lateral and a median load transmission elements to the engine, the mount having an integrated load transmission and failsafe assembly arranged to ensure the continuity of load transmission in the event of failure of a load transmission element and to perform its failsafe function in unitary, concentrated fashion in the median zone of the mount. The mount is characterized by the fact that the load transmission and failsafe assembly includes an assembly of a female clevis with two wings and of a projecting element passing with clearance through the two wings of clevis, one being integral with the engine and the other with the mounting beam.

16 Claims, 2 Drawing Sheets

U.S. PATENT DOCUMENTS

| | | | | |
|---|---|---|---|---|
| 7,267,301 B2 * | 9/2007 | Dron | ........................... | 244/54 |
| 7,325,770 B2 * | 2/2008 | Chevalier et al. | ............. | 244/54 |
| 2004/0094680 A1 | 5/2004 | Brefort et al. | | |
| 2004/0245383 A1 * | 12/2004 | Udall | ........................ | 244/54 |
| 2005/0269445 A1 * | 12/2005 | Chevalier et al. | ............. | 244/54 |
| 2005/0269446 A1 | 12/2005 | Dron | | |

FOREIGN PATENT DOCUMENTS

| | | |
|---|---|---|
| FR | 2 799 432 | 4/2001 |
| WO | WO 9311041 A1 * | 6/1993 |

* cited by examiner

AIRCRAFT ENGINE MOUNT

BACKGROUND OF THE INVENTION

1. Field of the Invention

The invention concerns a mount for aircraft engines, in particular for turbofan jet engines. On the pathway of the airstream passing through it, from upstream to downstream, an engine comprises an air inlet, a fan case, an intermediate case, a thrust mount, an exhaust case and an exhaust nozzle.

2. Description of the Related Art

An engine is generally attached to the aircraft by a forward mount and an aft mount. But there may be more than two mounts. The forward mount is attached to the intermediate case of the engine, and the aft mount onto a mounting ring connected to the exhaust case by a series of links and to the intermediate case via reverse thrust means when mounted onto the rear of the fuselage.

When the engine is mounted under the aircraft wing, the thrust mount comprises a plurality of thrust links. When the engine is attached to the fuselage, generally at the rear, the reverse thrust transmission between the reverser and the intermediate case is made via an outer fan duct. The invention especially, but not exclusively, concerns engines with an outer fan duct and the forward mounting of these engines. It also more particularly concerns the failsafe system of this mount, in which an engine is connected to a beam which itself is attached to an element of the aircraft frame, generally a pylon.

The intermediate case is attached to the beam of the forward mount at three points, respectively at the two side ends which are generally the high and low ends of the beam, and at a median part via three load transmission elements. The end elements of the beam are links, and the element of the median part is a central spigot.

The forward mount of an engine attached to the side of the rear fuselage ensures load transmission in four degrees: three degrees in translation—vertical axis Z, lateral axis Y and following thrust axis X—and one degree of rotation about the thrust axis X.

In the event of failure of one of the mounting elements, it is desirable for the failsafe system to continue transmitting the loads along the degree associated with the failed element.

Failsafe means are already well known.

Document U.S. Pat. No. 5,474,258 describes means which consist of doubling the normal load transmission equipment, with the drawback of the complexity and weight of doubling.

Document FR 2 820 402 also proposes doubling the normal equipment with an emergency equipment.

In document FR 2 799 432 the applicant proposed a simpler and especially a more lightweight failsafe system. This document describes a forward mount for an aircraft engine with outer fan duct intended, via an intermediate case, to be attached to the rear of an aircraft fuselage, the mount being arranged to be attached firstly by a beam to the aircraft fuselage, and secondly by two lateral and a median load transmission element to the intermediate case of the engine, the mount comprising an integrated load transmission and failsafe assembly arranged to ensure the continuity of load transmission in the event of failure of a load transmission element and to perform its failsafe function in unitary, concentrated fashion in the median zone of the mount.

With said mount, all the loads intended to be transmitted by a given element of the mount, after failure of such element, continue to be transmitted by the unitary failsafe means.

However, in this prior art it is provided that the loads intended to be transmitted by the lateral thrust links, in the event of failure, are transmitted by the central spigot. In another embodiment, provision is made for the loads of the thrust links, in the event of failure, to be transmitted by a sleeve flange.

SUMMARY OF THE INVENTION

The applicant has therefore sought, while preserving the advantages of the unitary, integrated nature of the load transmission and failsafe assembly, to increase its sturdiness, reliability and above all the visibility of actuation during inspections.

The invention concerns a forward mount of the type defined above, characterized by the fact that the load transmission and failsafe assembly comprises an assembly of a two-winged female clevis and a projecting element passing through the two wings of the clevis with clearance, one being integral with the intermediate case of the engine and the other with the mounting beam.

But the applicant wishes to widen the scope of its patent to an aircraft engine mount arranged to be attached firstly by a beam to the aircraft and secondly by two lateral and one median load transmission elements to the engine, the mount comprising an integrated load transmission and failsafe assembly arranged to ensure the continuity of load transmission in the event of failure of a load transmission element and to perform its unitary, concentrated failsafe function in the median zone of the mount, a mount characterized by the fact that the load transmission and failsafe assembly comprises an assembly consisting of a two-winged female clevis and a projecting element, passing through the two wings of the clevis with clearance, one being integral with the engine and the other with the mounting beam.

Therefore this present application is widened to any engine mount and not only to a forward mount attached to an intermediate case, and to any engine attached both under a wing and to the fuselage, and hence not only to an engine with outer fan duct to be attached to the fuselage.

Advantageously, the element either of the engine and more particularly of the intermediate case, or of the beam to which the projecting failsafe element is joined, is mounted with clearance between the two wings of the failsafe clevis.

Therefore there is clearance both between the failsafe pin and the bores made in the wings of the failsafe clevis, and between the mount element mounted between the two wings of the clevis—the beam in this case—and these wings.

In the event of failure of a lateral load transmission element, the loads are able to be transmitted through use of the clearance between the projecting element and the bores in the wings of the failsafe clevis, and these loads therefore transit via the clevis wings, the pin and the body of the beam before reaching the pylon.

In the event of failure of the median load transmission element, the vertical loads are transmitted as in the failure of the lateral end elements. Regarding thrust loads, these are transmitted through use of the clearance between the beam (or the engine, or more particularly the intermediate case if the roles are reversed) and the wings of the clevis, and these loads therefore transit via the clevis wings and the beam body before reaching the pylon.

The invention is remarkable in its capacity to ensure its failsafe function in all cases of failure.

BRIEF DESCRIPTION OF THE DRAWINGS

It will be more readily understood with the help of the following description of a preferred embodiment of the mount, with reference to the appended drawing, in which.

DETAILED DESCRIPTION OF THE PREFERRED EMBODIMENTS

Figure 1:
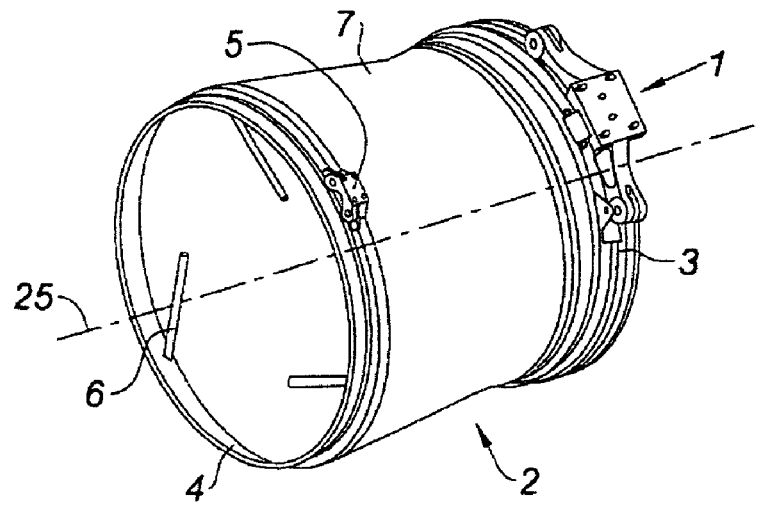
FIG. 1 is a perspective view of the mount and of the engine components required for mounting to be attached to the aircraft fuselage.
Figure 2:
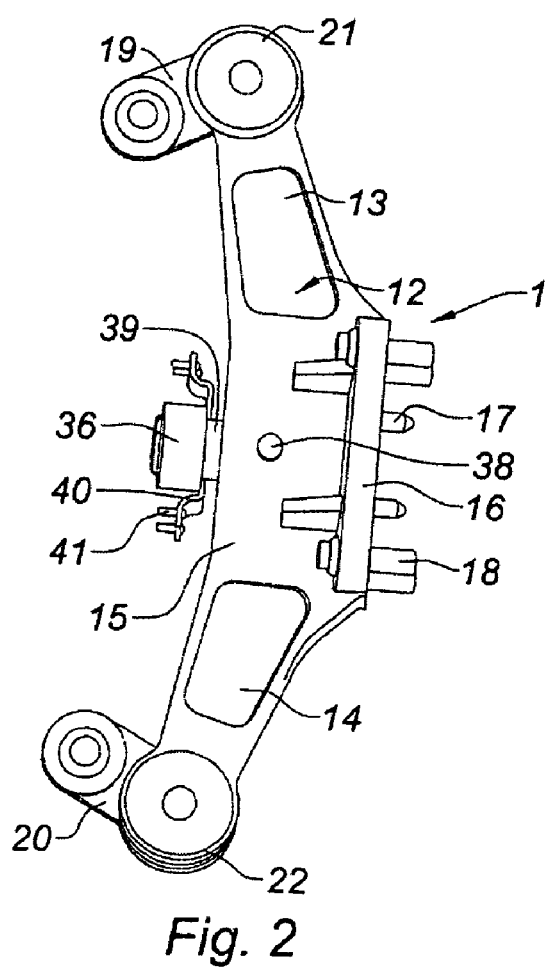
FIG. 2 is a front view of the mounting beam of the invention, without an engine.

Mount 1, which here is a forward mount and will now be described, is intended to attach a turbojet engine 2 again to an aircraft fuselage and more frequently the rear fuselage, comprising in particular an intermediate case 3 to which the forward mount 1 is attached, a mounting ring 4 to which an aft mount 5 is attached and which is connected to an exhaust case, not shown, by a series of links 6. The mounting ring 4 is also attached to the intermediate case 3 via a reverse thrust outer fan duct 7.

Figure 3:
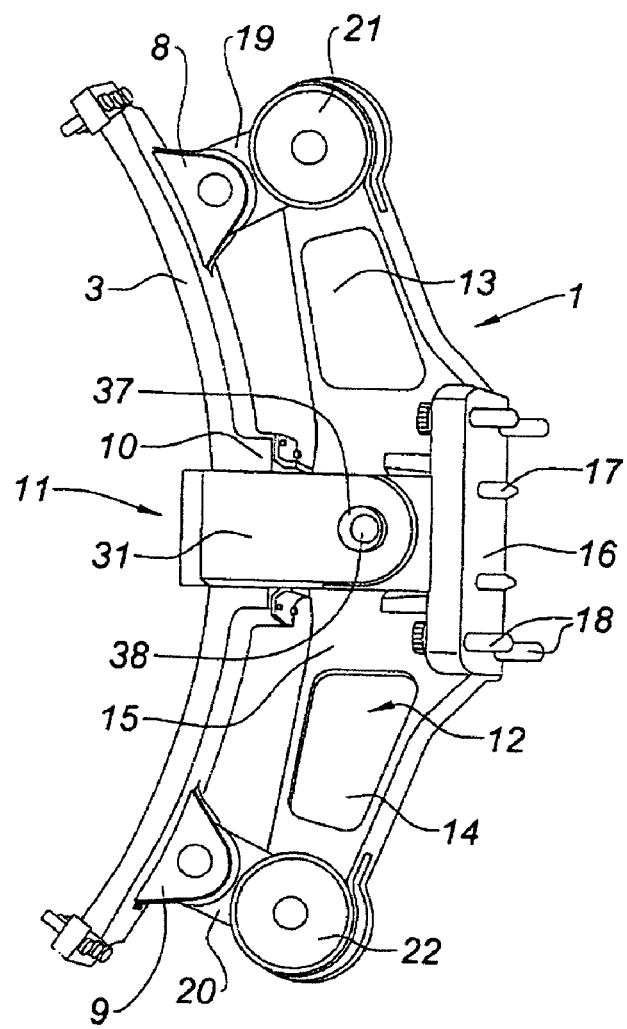
FIG. 3 is a perspective view of the mounting beam and intermediate engine case attached to the beam.
Figure 4:
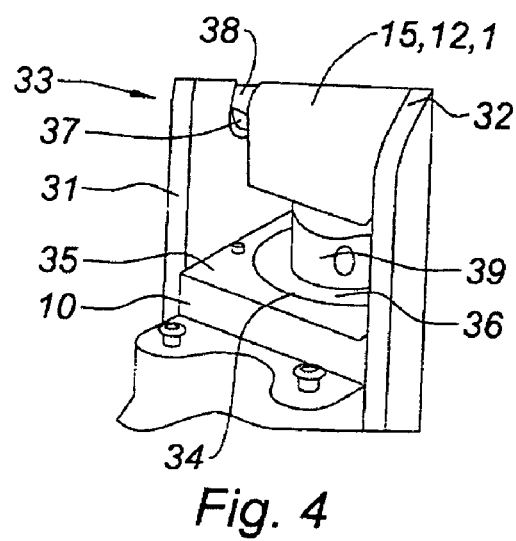
FIG. 4 is a perspective view of the clevis and of the failsafe pin of the mounting beam.

On an arcuate frame 3 integral with the intermediate case (FIG. 3) for the forward attachment of the turbine engine, is an upper lateral female clevis 8 and a lower lateral female clevis 9; between the two devises in a zone which can be termed median, the intermediate case has a radially projecting platform 10 to receive a load transmission and failsafe element 11 of mount 1 which is described below.

Mount 1 comprises a beam 12 of generally elongated trapezoid shape and slightly curvilinear having two arms 13, 14 extending either side of a median or central portion 15 which ends at the smaller base of the trapezoid in a sidewardly projecting plate 16 for attachment to a pylon (not shown) of the aircraft fuselage structure.

Attachment of the mounting beam 12 to the pylon is made using plate 16 with shear pins 17 and screws 18 extending to the four corners of the plate and orthogonal to it.

The two free ends 21, 22 of arms 13, 14 of the mounting beam are connected to the two devises 8, 9 of the intermediate case (in fact of the arcuate frame) via two thrust links 19, 20 pivot-mounted in their case clevis and to the two ends 21, 22 of the beam arms also arranged in clevis form.

The median load transmission and failsafe element 11 will now be described.

Two radial plates 31, 32 extend laterally along platform 10 of the intermediate case substantially in planes orthogonal to the thrust axis 25 and extend radially beyond to form the two wings of a female clevis 33. A radial hollow 34 is provided in platform 10 starting at its outer surface 35 to receive, via a ball-joint 36, a load transmitting pin or spigot 39 of the mounting beam 1 as specified below.

In their external free portion the failsafe wings 31, 32 comprise a transverse bore 37 to receive a pin 38 integral with beam 12. Element 38 is not necessarily a pin; it may more generally be a protruding element.

Spigot 39, 36 is suspended from the central portion 15 of the beam body 12 on the side opposite plate 16. Ball-joint 36 is therefore an element that is received in the cylindrical housing 34 of the failsafe clevis 33 of the engine casing, forming a ball-joint housing. Spigot 39, 36 is also integral with the platform 10 of case 3 via a plate 40 mounted around groin 39 between the ball-joint and the beam. Plate 40 is screwed to platform 10 by four screws 41.

The central portion 15 of the beam body 12 is arranged between the two wings 31, 32 of clevis 33, the pin 38 either inset or mounted through the beam body extending through bores 37 of the wings with failsafe clearance. The beam, with which pin 38 is integral, is fixed in translation between the inner faces of the two wings with failsafe clearance either side, by fitting ball-joint 36 of the spigot into its housing 34 in clevis 33.

The three mounting devises 8, 9, 33 just described are integral with the intermediate case 3 of the turbine engine. Evidently the arrangements could be is reversed with devises integral with the beam.

The clevis 33, spigot 39, 36 and pin 38 form a load transmission and failsafe assembly 11 which has the advantageous specificity of being unitary and concentrated in the median zone of the mounting beam 1.

In the event of failure of one of links 19, 20 the intermediate case 3 swings very slightly until the clearance between the pin 38 and the bores 37 of wings 31, 32 is taken up, the loads then transiting via these wings 31, 32, pin 38 and the body beam 12, before reaching the pylon through plate 16, screws 18 and pins 17.

In the event of failure of the spigot 36, 39, the thrust is taken up by use of the clearance between the beam body 12 and either one of the two wings 31, 32, the loads transiting via wings 31, 32, pin 38, plate 16, screws 18 and shear pins 17 before reaching the pylon.

The invention claimed is:

1. A mount for an aircraft engine configured to be attached firstly by a mounting beam to an aircraft, and secondly by lateral load transmission elements and a median load transmission element to the aircraft engine, wherein said lateral and median load transmission elements transmit loads from the engine to the aircraft during normal operation of said mount, the mount comprising:

said mounting beam;

said lateral load transmission element; and an integrated load transmission and failsafe assembly including said median load transmission element, said integrated load transmission and failsafe assembly being configured to ensure continuity of load transmission for said loads transmitted from the engine to the aircraft in the event of failure of one of said lateral and median load transmission elements, wherein the load transmission and failsafe assembly comprises a female clevis with two wings and a projecting failsafe element passing with clearance through the two wings of said female clevis, one of said female clevis and said projecting failsafe element being integral with the aircraft engine or with an intermediate case of said aircraft engine and the other of said female clevis and said projecting failsafe element being integral with the mounting beam, wherein said clearance between said projecting failsafe element and said two wings of said female clevis extends around an entire circumference of said projecting failsafe element.

2. A mount as in claim 1, wherein a portion of said mounting beam is arranged between said two wings of said female clevis and the projecting failsafe element is mounted through said portion of the mounting beam arranged between the two wings of said female clevis.

3. A mount as in claim 1, wherein said median load transmission element is positioned between said two wings of said female clevis, and wherein the female clevis defines a radial housing between said two wings, wherein said radial housing is configured to receive the median load transmission element.

4. A mount as in claim 1, wherein said integrated load transmission and failsafe assembly comprises means for transmitting loads via the two wings of the female clevis, the projecting failsafe element and the mounting beam in the event of failure of one of said lateral load transmission elements.

5. A mount as in claim 1, wherein said integrated load transmission and failsafe assembly comprises means for transmitting vertical loads via the two wings of the female clevis, the projecting failsafe element and the mounting beam in the event of failure of the median load transmission element.

6. A mount as in claim 1, wherein said integrated load transmission and failsafe assembly comprises means for transmitting thrust loads via the two wings of the female clevis and the mounting beam in the event of failure of the median load transmission element.

7. A mount as in claim 1 which is a forward mount attached to said intermediate case of the aircraft engine.

8. A mount as in claim 1, wherein said aircraft engine has an outer fan duct configured to be attached to an aircraft fuselage of said aircraft.

9. A mount as in claim 1, wherein said female clevis is integral with the intermediate case of said aircraft engine such that there is no joint between said female clevis and said aircraft engine, and wherein said projecting failsafe element is integral with the mounting beam.

10. A mount as in claim 1, wherein said projecting failsafe element is integral with the intermediate case of said aircraft engine and said female clevis is integral with the mounting beam.

11. A mount as in claim 1, wherein said two wings of said female clevis extend substantially in planes orthogonal to a thrust axis of said aircraft engine.

12. A mount as in claim 1, wherein said median load transmission element is positioned between said two wings of said female clevis, wherein said median load transmission element includes a transmitting pin connected to and extending away from a central portion of said mounting beam and toward said aircraft engine, said median load transmission element further including a ball joint fixed to said transmission pin.

13. A mount as in claim 12, wherein said ball joint is housed in a ball-joint housing located between the two wings of the female clevis.

14. A mount as in claim 13, wherein said median load transmission element is fixed to said intermediate case of said engine.

15. A mount as in claim 13, wherein said median load transmission element further includes a plate mounted between said ball joint and said central portion of said mounting beam, wherein said plate is screwed to said intermediate case of said aircraft engine.

16. A mount as in claim 1, wherein said median load transmission element includes a spigot that is, during normal operation, integral with a platform on an intermediate case of said engine, and wherein said spigot is further integral, during normal operation, with a central portion of said mounting beam, said central portion being attached to a pylon of said aircraft.

* * * * *

UNITED STATES PATENT AND TRADEMARK OFFICE
CERTIFICATE OF CORRECTION

PATENT NO. : 7,527,220 B2  
APPLICATION NO. : 11/087604  
DATED : May 5, 2009  
INVENTOR(S) : Sebastien Dron Page 1 of 1

It is certified that error appears in the above-identified patent and that said Letters Patent is hereby corrected as shown below:

Column 3, line 26, change "devises" to --clevises--.

Column 4, line 6, change "devises" to --clevises--;
        line 8, delete "is";
        line 8, change "devises" to --clevises--.

Signed and Sealed this

Twenty-fifth Day of August, 2009

David J. Kappos  
*Director of the United States Patent and Trademark Office*